United States Patent [19]

Lewis et al.

[11] Patent Number: 4,510,257

[45] Date of Patent: Apr. 9, 1985

[54] SILICA-CLAY COMPLEXES

[75] Inventors: Robert M. Lewis, Sugarland, Tex.; Kevin C. Ott, Chatsworth, Calif.; Rutger A. Van Santen, Houston, Tex.

[73] Assignee: Shell Oil Company, Houston, Tex.

[21] Appl. No.: 559,545

[22] Filed: Dec. 8, 1983

[51] Int. Cl.³ ............................................. B01J 21/16
[52] U.S. Cl. ..................................... 502/63; 502/80; 502/84; 260/448 C
[58] Field of Search ........................... 502/62, 63, 80; 260/448 C

[56] References Cited

U.S. PATENT DOCUMENTS

| | | | |
|---|---|---|---|
| 3,676,367 | 7/1972 | Raible | 502/63 |
| 3,725,302 | 4/1973 | Shimely et al. | 260/448 C |
| 4,053,493 | 10/1977 | Oswald | 502/80 X |
| 4,159,994 | 7/1979 | Seto et al. | 502/62 X |
| 4,248,739 | 2/1981 | Vaughan et al. | 502/63 |

FOREIGN PATENT DOCUMENTS

| | | | |
|---|---|---|---|
| 979559 | 1/1965 | United Kingdom | 502/62 |

*Primary Examiner*—Carl F. Dees

[57] ABSTRACT

The present invention relates to intercalated clay compositions wherein the interlayers of said clay have been intercalated with three-dimensional silicon oxide pillars whereby the pillars comprise at least two silicon atom layers parallel to the clay interlayers. These materials have useful catalytic and adsorbent properties.

16 Claims, 6 Drawing Figures

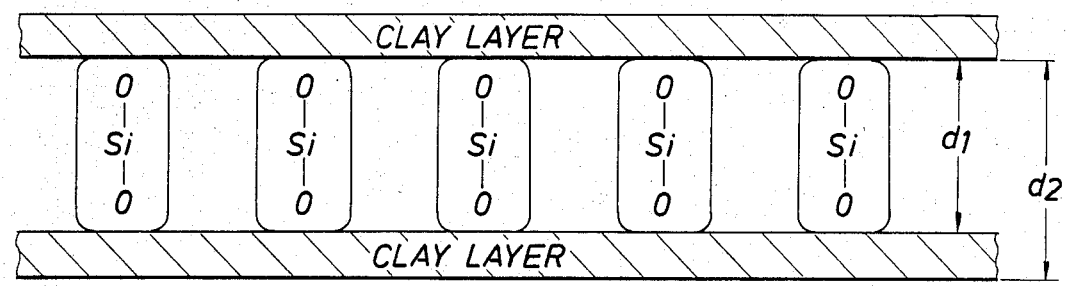
FIG. 1
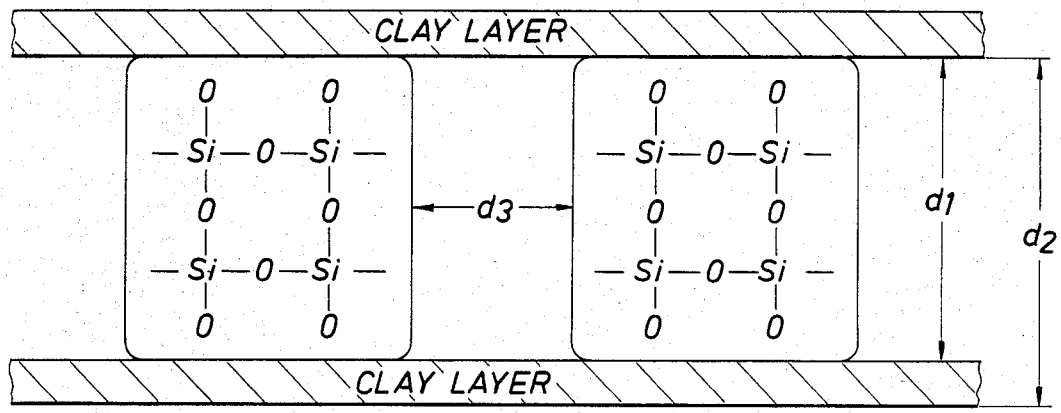
FIG. 2
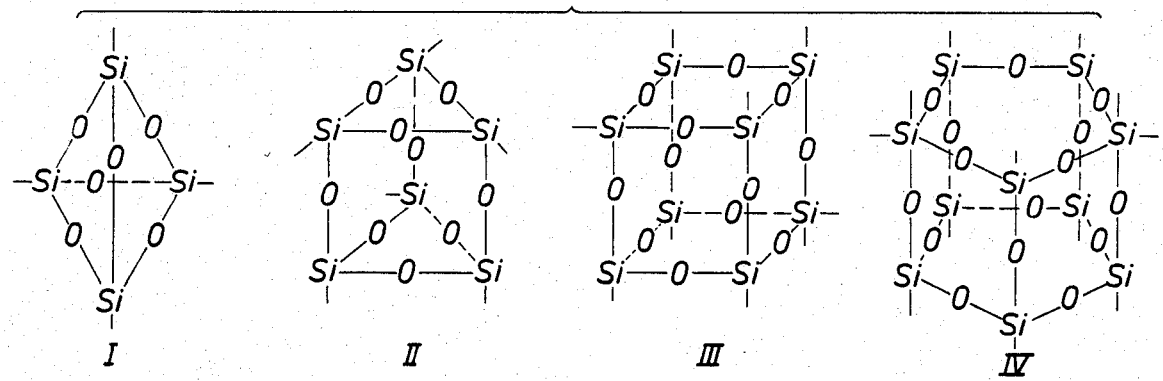
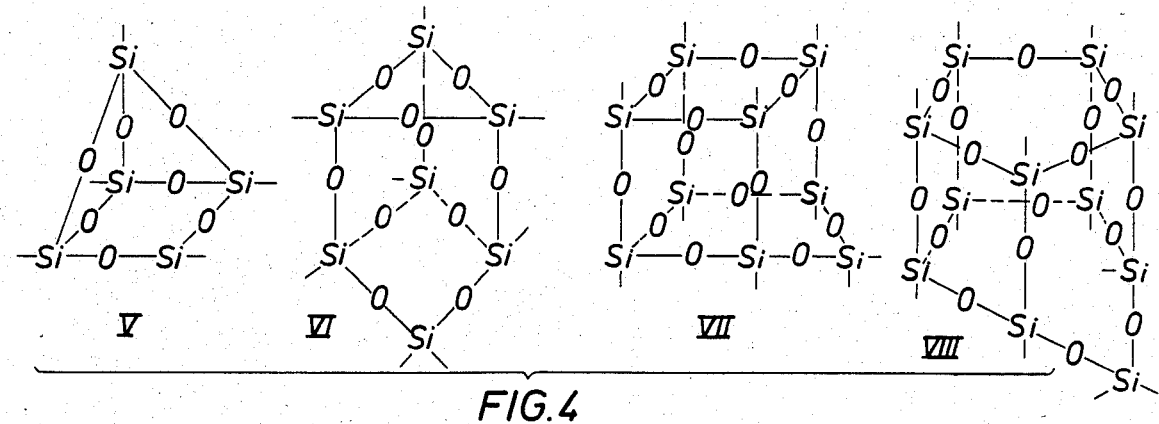
FIG. 3
FIG. 4

SILICA-CLAY COMPLEXES

FIELD OF THE INVENTION

The present invention relates to intercalated clay compositions wherein the interlayers of said clay have been intercalated with three dimensional silicon oxide pillars whereby the pillars comprise at least two silicon atom layers parallel to the clay interlayer. These materials have useful catalytic and adsorbent properties.

BACKGROUND OF THE INVENTION

Layered naturally occurring and synthetic smectites such as bentonite, montmorillonites and chlorites may be visualized as a "sandwich" composed of two outer layers of silicon tetrahedra and an inner layer of alumina octahedra. These "sandwiches" or platelets are stacked one upon the other to yield a clay particle. Normally this arrangement yields a repeated structure about every nine and one-half angstroms. A considerable amount of study has shown that these platelets can be separated further, by as much as 30 to 40 Å, i.e. interlayered by intercalation of various polar molecules such as water, ethylene glycol, and various amines. The interlayered clays thus far prepared from naturally occurring smectites, however, are not suitable for general adsorbent and catalytic applications because they tend to collapse when subjected to high temperature.

In the past, clay materials have been intercalated with a variety of materials in order to form a supported open structure material which is useful as an adsorbent, a catalyst support, filtration medium or the like. However, it has been difficult to obtain a modified clay material which is stable at relatively high temperatures on the order of 250° C.–500° C. When a solvent swollen clay is heated to high temperature, the solvent is vaporized and collapse of the silicate sheets of the clay results as the solvent is removed from the interlamellar regions. This collapse significantly reduces the surface area of the clay because the internal surfaces are no longer available for adsorption. To solve this problem, a number of approaches have been taken to modify the clay by introducing supports or "columns" of material into the interlamellar regions of the clay to hold the silicate sheets of the clay apart. For instance, in the preparation of clay materials intended for use at relatively low to moderate temperatures, the clay layers have been separated with an organic material. For instance Shabtai et al, Proc. 6th Int. Congr. Catal., B5, 1–7 (1976) show a system in which smectite is interacted with di- or polycations derived from rigid, preferably cage-like amines, which acquire a single stable orientation in the interlayer space because of the steric requirements dictated by the configuration of the structure. A 1,4-diazabicyclo[2.2.2]octane-montmorillonite was found to posses significant molecular sieve properties and markedly higher catalytic activity for esterification of carboxylic acids in comparison to ordinary alkylammonium-exchanged montmorillonites.

The kaolin group materials comprise a silica tetrahedral sheet and an alumina octahedral sheet combined into the kaolin unit layer. Seto et al U.S. Pat. No. 4,159,994 show the intercalation of kaolin materials with an ammonium salt of a carboxylic acid having more than two carbon atoms, the alkali metal salt of a carboxylic acid having more than two carbon atoms, a lower alkylene glycol or a quaternized ammonium radical.

Because of the failure of the organic material impregnated clays at high temperatures, approaches have been taken to improve the stability of intercalated clays at high temperatures by intercalating clay substrates with various metal compounds. Thus, Lahav et al, Clays and Clay Minerals, 26, 107–115 (1978) have demonstrated the intercalation of smectite with interlamellar structures derived from aluminum, iron and nickel hydroxides. Yamanaka et al, Clay and Clay Minerals, 27(2), 119–124 (1979) have shown the intercalation of Na-montmorillonite with zirconyl chloride which gives rise upon dehydroxylation to internal pillars of zirconium oxide. This system appears to give rise to a structure which is thermally stable at elevated temperatures. Yet another metal salt intercalated clay system has been shown by V. E. Berkheiser et al in Clay and Clay Minerals, 25, 105–112 (1977) where smectite is intercalated with 1,10 phenanthroline metal complexes. Traynor et al, Clay and Clay Minerals, 26, 318–326 (1978) have shown the intercalation of smectities with bipyridyl metal complexes. Still further, Loeppert et al, Clay and Clay Minerals, 27(3), 201–208 (1979) have demonstrated the intercalation of aqueous dispersions of $Na^+$-smectite or n-butylammonium-vermiculite with sulfate salts of Fe(II), Co(II) or Ni(II) bipyridyl or 1,10-phenanthroline complexes, whereby intercalated phases with spacings of about 29.5 Å are obtained. Still another disclosure of the stabilization of clay materials is U.S. Pat. No. 4,176,090, wherein the porous interlayer structure of a clay is stabilized with "pillars" of stable inorganic polymers of oxides of metals such as aluminum, zirconium and/or titanium. The oxide pillars are formed by hydrolysis of salts of the metals which have been impregnated into the open structure of the clay at the appropriate pH. De Le Cruz et al, Proceedings of the International Clay Conference, 1972 (Madrid, Spain, June 23–30), pp. 705–710 have shown modified montmorillonite and vermiculite substrates which have been treated with trimethylchlorosilane or dimethyldichlorosilane, with the indication given that the organochlorosilane react with interstitial water in the clay substrate to form silanol groups therein. However, hydrolysis of these organosilane reactants does not result in the formation of silica or hydrated silica structures in the clay. Moreover, it has been postulated that if the organosilanol impregnated clay is heated, the silanol compounds would react to form low molecular weight siloxane compounds which are not attached to the interlayer framework of the clay and could be eliminated from the clay substrate. Pinnavaia, et al., U.S. Pat. No. 4,367,193 have succeeded in producing clay intercalated with silica producing a composition having significant high temperature stability. The teachings of Pinnavaia et al are limited to producing intercalated clay compositions having only one layer of silicon atoms separating the clay layers, resulting in a clay layer spacing ranging from about 9.6 to about 12.6 Å. There still exists the need for high temperature-stable silica intercalation clay compositions having larger interlayer distances. Larger interlayer distances would allow the use of higher molecular weight and bulkier organic molecules to take part in catalytic reactions and adsorption processes.

SUMMARY OF THE INVENTION

The present invention relates to silica intercalated clay compositions and methods for producing them. The instant compositions comprise clay which have been intercalated with three-dimensional silicon oxide pillars resulting in compositions having the clay layers separated by at least two layers of silicon atoms.

The instant compositions have excellent high temperature and hydrothermal stability. They are useful as catalysts, catalyst supports, adsorbents and filtering bed media. They are particularly useful for process involving large or bulky organic molecules.

BRIEF DESCRIPTION OF THE DRAWINGS

FIG. 1 is a respresentation of a silica intercalated clay of the prior art (Pinnavaia et al U.S. Pat. No. 4,367,163).

FIG. 2 is a representation of one specific embodiment of the silica intercalated clay of the instant invention showing two silicon layers intercalated between the clay layers.

FIG. 3 is a representation of four of the lower polyhedral oligosilsequioxanes which serve as pillars in the intercalated clay composition of the instant invention.

FIG. 4 is a representation of four of the homo derivatives of the silsesquioxanes shown in FIG. 3 and which also serves as pillars in the instant compositions.

DESCRIPTION OF THE PREFERRED EMBODIMENTS

Figure 5:
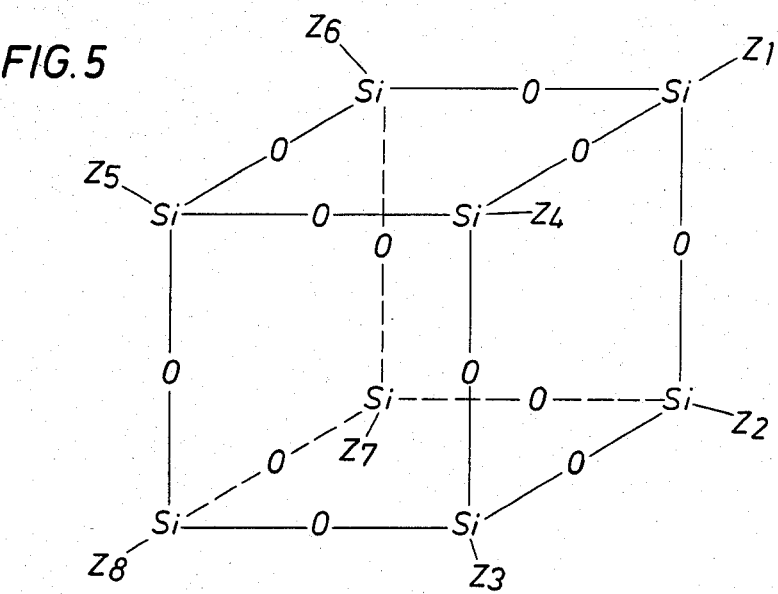
FIG. 5 is a representation of a functionalized cubic oligosilsesquioxane.

The outstanding feature of the present invention is that a clay based composition is provided in which the open, porous network of the clay is stabilized by intercalated silica structures between the interlayers of the clay wherein the silica structures or pillars comprise at least two layers of silicon atoms, resulting in an interlayer separation of greater than about 6 Å. The term "intercalation" is a term of art which indicates the insertion of a material between the layers of a clay substrate. The article authored by Loeppert, Jr. et al, Clays and Clay Minerals, 27(3), 201–208 (1979) is an example of a reference which uses the term in the same way it is used in the present specification. As used herein the term "interlayer spacing" refers to the 001 spacing which is represented by the term "$d_2$" in FIGS. 1 and 2. The term "interlayer separation" refers to the distance between two adjacent clay layers and is represented the term "$d_1$" in FIGS. 1 and 2. The term "pillar separation" refers to the distance between adjacent silica pillars and is represented by the term "$d_3$" in FIG. 2.

The clays which can be utilized as starting materials for the clay product of the invention are those lattice clay minerals and their synthetic analogues which are capable of swelling. Suitable clays include the expandable smectites and vermiculite, as well as synthetic forms thereof such as reduced charge montmorillonite. Hofmann et al, Z. Anorg. Allg. Chem., 212, 995–999 (1950) and G. W. Brindley et al, Clays and Clay Minerals, 19, 399–404 (1971) describe methods of preparing such synthetic clays.

Smectites are 2:1 clay minerals that carry a lattice charge and characteristically expand when solvated with water and alcohols, most notably ethylene glycol and glycerol, and are generally represented by the formula:

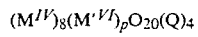

$$(M^{IV})_8(M'^{VI})_pO_{20}(Q)_4$$

wherein p equals 4 for cations with a +3 charge, equals 6 for cations with a +2 charge, Q is hydroxyl or fluoride, IV indicates an ion coordinated to four other ions, and VI indicates an ion coordinated to six other ions. M is commonly $Si^{4+}$, optionally partially substituted by other ions such as $Al^{3+}$ and/or $Fe^{3+}$ as well as several other four coordinate ions such as $P^{5+}$, $B^3$, $Ge^{4+}$, $Be^{2+}$, and the like. M' is commonly $Al^{3+}$ or $Mg^{2+}$, but also may be partially substituted with hexacoordinate ions such as $Fe^{3+}$, $Fe^{2+}$, $Ni^{2+}$, $Co^{2+}$, $Li^+$, and the like. The charge deficiencies created by the various substitutions into these four and six coordinate cation positions are balanced by one or several cations located between the structural units. Water may also be coordinated to these structural units, bonded either to the structure itself, or to the cations as a hydration shell. When dehydrated, the above structural units have a repeat distance or interlayer spacing of about 9 to 12 A, as measured by X-ray diffraction. Commercially available smectites include montmorillonite, bentonite, beidellite, hectorite, saponite, sauconite and nontronite.

In the preparation of the silica intercalated clay of the present invention, a clay substrate is impregnated with a polyhedral oligosilsesquioxane-containing reactant which will give rise to a three-dimensional supporting silica structure between the layers of the clay. When the clay is treated with the silsesquioxane-containing reactant, the silsesquioxane diffuses between the layers of the clay and is bound to the layer by ionic bonds (through ion exchange with the native metal ions in the clay) or by physical absorption (e.g., of the Van der Waal's or hydrogen bonding e).

The basic three-dimensional silicate structure which makes up the silica pillars and the silica pillar precursors are described in the article by Voronkov et al, "Polyhedral Oligosilsesquioxanes and their Homo Derivatives", in *Topics in Current Chemistry*, 102, pp 199–236, Springer-Verlag, 1982. These three-dimensional silicate structures are known as polyhedral oligosilsesquioxanes. They are composed of a polyhedral silicon-oxygen skeleton which bear organic or inorganic substituents attached to the silicon atoms. The molecules of these compounds have the general formula $(XSiO_{1.5})_n$ where n is an even number (n $\geq$ 4) and X=H, organyl, halogen, hydroxyl, oxy, etc and the X's may be the same or different. The structure of lower oligosilsesquioxanes is represented by structural formulae I–IV illustrated in FIG. 3. These compounds may be considered as the products of complete hydrolytic condensation of the corresponding trifunctional monomers, $XSiY_3$ with Y=Hal, OH, OR, OCOR, etc.

A minor structural variation of the polyhedral oligosilsesquioxanes shown in FIG. 3 are the so-called homosilsesquioxanes. They differ from the above described oligosilsesquioxanes in that the Si—O bond of the latter is inserted by a XX'SiO group which is a homologous link in linear and cyclic oligo- and polysiloxanes. Homooligosilsesquioxanes are described by the general formula $(XSiO_{1.5})_n(OSiX_2)_m$, wherein m and n are integers and X is as described above. The structure of their lower members is shown by formulae V–VIII illustrated in FIG. 4. These compounds are the by-products of the synthesis of oligosilsesquioxanes and are usually found in minor amounts. Because of the close similarity in structure between the oligosilsesquioxanes and their homo derivatives, the term "oligosilsesquioxane" when used herein will include the polyhedral oligosilsesquioxanes as well as their homo derivatives. The pillar material can thus contain a mixture of polyhedral oligosilsesquioxanes and their homo derivatives.

The pillar materials used to prepare the compositions of the instant invention contain one or more compounds having the general formula $(ZSiO_{1.5})_n(OSiZ_2)_m$ where n and m are zero or an integer and n+m does not equal zero. In many cases, depending on preparative techniques, m will equal zero. A three-dimensional representation of a pillar for n=8 and m=0 is illustrated in FIG. 5. Z is an organic moiety which serves as a coordinating and/or exchange group which allows the entire unit to be brought between the layers of the clay to be pillared. The organic moiety can be chosen such that it contains a coordinating group that is readily intercalated into the layered structure. Examples of coordinating structures include amines, amides, sulfoxides, glycols, alcohols and the like. Alternately, the organic moiety can be chosen such that it contains a cationic species that is readily exchanged into the layered structure. Examples of cationic species include ammonium ion, phosphonium ion, sulfonium ion, pyridinium ion and the like. The organic moieties Z on a structure may be the same or different. It is, however, easier to make pillar structures having identical Z's.

There are a number of routes to the synthesis of oligosilsesquioxane pillar materials. The aforementioned Voronkov et al reference, which is incorporated by reference herein, lists several procedures for the synthesis of the oligosilsesquioxane pillar materials and in general demonstrates the state of the art in the synthesis of the compounds. Illustrative, but non-exclusive reactions for forming the polyhedral silicon-oxygen skeleton of oligosilsesquioxanes are as follows:

1. Hydrolytic condensation of trifunctional monomers, $XSiY_3$ (with X=a chemically stable substituent and Y=a highly reactive substituent).
2. Condensation of Si-functional oligoorganylcyclosiloxanes, $[XYSiO]_m$ (e.g., $[C_2H_5SiHO]_{4.5}$).
3. Co-condensation of organosilicon monomers and/or oligomers of different structure and composition.
4. Thermolysis of polyorganyl silsesquioxanes.

In some cases, these reactions may be combined in order to obtain certain oligosilsesquioxanes or to increase the yield.

The preferred method of preparing the pillar materials starts with the hydrolytic condensation of the trifunctional monomers, $XSiY_3$. Hydrolytic polycondensation of trifunctional monomers of the type $XSiY_3$ leads to cross-linked three-dimensional as well as network and cissyndiotactic (ladder-type) polymers, $(XSiO_{1.5})_n$. With increasing amount of solvent, however, the corresponding condensed polycyclosiloxanes, polyhedral oligosiloxanes and their homo derivatives may be formed. The reaction rate, the degree of oligomerization and the yield of the polyhedral compounds formed strongly depend on the following factors:

1. Concentration of the initial monomer in the solution
2. Nature of solvent
3. Character of substituent X in the initial monomer
4. Nature of functional groups Y in the initial monomer
5. Type of catalyst
6. Temperature
7. Addition of water
8. Solubility of the polyhedral oligomers formed
9. pH Variations of the above factors have been studied in general and can be found in the literature, such as the aforementioned Voronkov et al reference; otherwise, they can be determined by one skilled in the art through routine experimentation. Certain of these factors are discussed below.

Due to the extremely high reactivity of trifunctional organosilicon monomers of the above type (mainly organyltrichlorosilanes), the synthesis of the most important oligomers is carried out in an organic solvent with the addition of water and in the presence of an appropriate acid or base catalyst. The high concentration of the reagents facilitates the formation of high polymers. When diluted solutions are used, intramolecular cyclization predominates leading to polyhedral oligomers along with other volatile products. The most suitable $XSiY_3$ concentration in the preparation of polyhedral silsesquioxanes depends on the character of substituents X and Y in the initial monomer, the solvent nature, the temperature, the amount of water added and the catalyst concentraton. The concentration of alkyltrichlorosilanes having lower alkyl substituents, which is most favorable for the preparation of the corresponding polyhedral octamers, ranges from 0.1 to 0.2M. In the $XSi(OR)_3$ hydrolytic polycondensation, more concentrated solutions may be used (0.3–0.5M). The synthesis of oligoalkylsilsesquioxanes bearing higher alkyl substituents requires even more concentrated solutions (2.2M). It should be taken into consideration that too low concentrations of the initial monomer considerably decrease the rate of polymerization.

Oligosilsesquioxanes are formed in both polar and nonpolar solvents. Illustrative, but non-limiting examples of solvents that have been found useful include benzene, toluene, cyclohexane, hexamethylsiloxane, acetone, ethyl ether, alcohols, such as methyl, ethyl, propyl and benzyl alcohol, ketones, organic acids, their anhydrides or esters, ketones, toluene, nitrobenzene, pyridine, ethylene glycol dimethyl ether, tetrahydroforan, acetonitrile, diglyme, methyl isobutyl ketone.

Illustrative but non-limiting examples of the substituent X in the initial monomer $XSiY_3$ include the lower alkyls, such as methyl, ethyl, propyl, butyl, hexyl, heptyl, etc; vinyl, allyl, benzyl, 2-methyl benzyl, 4-methyl benzyl, nitrobenzyl, etc., tetramethyl ammonium, etc.

Illustrative but non-limiting examples at the substituent Y in the initial monomer $XSiY_3$ include, hydroxyl, halo such as chloro, bromo, iodo, alkoxy such as methoxy, ethoxy; acyloxy, etc.

The formation of polyhedral oligosilsesquioxanes from linear, cyclic and polycyclic products of the hydrolytic polycondensation of trifunctional monomers, $XSiY_3$, generally occurs only in the presence of either acid or base catalysts. Only the hydrolysis of lower alkyltrichlorosilanes generally requires no special catalyst. In this case the process is autocatalytic and the products are fairly reactive. Catalysts that have been useful include: HCl, $H_2SO_4$, $HCl+CH_3COOH$, $H_2SO_4+SO_3$, $Br_2$, $(C_2H_5)_4NOH$, KOH, $C_6H_5CH_2(CH_3)_3NOH$, $(CH_3)_4NOH$, $(C_2H_5)_3N$, etc.

Temperatures for the hydrolytic polycondensation of the monomer $XSiY_3$ are relatively low. Temperatures will vary depending on the monomer, solvent and other reaction conditions. Reported temperatures range from below 0° C. to 160° C.

The formation of oligoorganoylsilsesquioxanes from organyltrichlorosilanes may occur without the addition of water if methanol or ethanol are used as the solvent. However, water is involved in the above reaction since it is generated by the interaction of alcohol with hydrogen chloride. When using the trichlorosilanes as starting materials, the molar ratio of $XSiCl_3:H_2O$ should be 1:1 or greater. Optimum ratios will depend on the particular monomer being utilized.

The Z moiety in the oligosilsesquioxane pillar material $(ZSiO_{1.5})_n$, will be X moiety of the monomer $XSiY_3$, i.e., pillar material $(ZSiO_{1.5})_n$ = condensation product $(XSiO_{1.5})_n$, or the X of the condensation product $(XSiO_{1.5})_n$ can be modified or replaced by a different moiety through subsequent chemical reaction on $(XSiO_{1.5})_n$. Preferably all the Z's on a pillar material will be the same. However, it is possible, through special techniques such as the hydrolytic co-condensation of 2 or more monomers with different X's, to produce pillar precursors having different Z moieties. It is postulated that the size of the moiety Z is one of the factors that can affect the pore size distribution in the final calcined product. An increase in the bulk or size of the Z-moiety is expected to increase the interpillar distance ($d_3$ in FIG. 2), all other variables being held constant.

The general technique for preparing the silica intercalated clay of the present invention comprises first preparing a solution of the desirable oligosilsesquioxane pillaring agent containing the appropriate Z-moiety which contains either a cationic and/or co-ordinating atom(s) which will allow the pillaring agent to be ion-exchanged or otherwise intercalated into the clay layer. The clay is then impregnated with the solution containing the pillaring agent. The clay substrate can be swelled with a solvent compound capable of swelling the clay prior to interaction with the solution containing the pillaring agent, or a solvent compound capable of swelling the clay may be added to the solution containing the pillaring agent. Suitable swelling compounds are polar compounds such as water, ketones like acetone, methylethylketone, etc; sulfoxides like dimethylsulfoxide; formamides and the like. These swelling agents have been extensively studied and one skilled in the art can find many suitable ones from the literature. The swelling solvent and the solvent containing the pillaring agent should be mutually soluble in the concentration ranges utilized.

The temperature at which the clay is impregnated with the pillaring agent is not critical. Normally, the temperature used is about room temperature, although temperatures ranging from the freezing point to the boiling point of the solution containing the pillaring agent are satisfactory.

The clay substrate is impregnated with an amount of pillaring agent sufficient to give an intercalated silica structure. The amount of silica intercalated within the layers should be an amount at least sufficient to maintain the spacing of the expanded clay.

Frequently, the pH of the solution containing the pillaring agent will have to be adjusted to provide for optimum intercalation. For example, when the pillaring agent contains a cationic moiety, the pH should be adjusted above about 6 in order to minimize ion exchange of hydrogen ions in preference to the pillaring agent.

The impregnated clay normally is then heated in an oxidizing atmosphere, such as one containing air or water to burn off the organic moiety of the intercalated pillaring agent. A temperature which is sufficient to fully oxidize all organic material normally ranges from about 100° C. to about 800° C., preferably 400°–800° C.

In a general fashion the compositions of the instant invention which comprise clays intercalated with three-dimentional silica structures (pillars) are prepared by impregnating the clay with a solution containing at least one polyhedral oligosilsesquioxane pillaring agent of the following general formula, $(ZSiO_{1.5})_n(OSiZ_2)_m$ where n and m are zero or an integer and n+m does not equal zero and m+n preferably ranges from 4 to about 12, and Z is an organic moiety containing an atom(s) possessing cationic and/or coordinating characteristics with the proviso that all of the Z's on a particular oligosilsesquioxane need not be the same. At times the intercalated clays are utilized as such after removing excess solvent, say by drying with moderate heat and/or vacuum. But more frequently the intercalated clay is subsequently calcined in an oxidizing atmosphere at temperatures ranging from about 100° C. to about 800° C., preferably from about 400°–800° C.

The intercalated clay product of the present invention is useful as an absorbent in a variety of applications, especially as particles in a Tyler mesh size range of 4 to 400, or in a spray dried form and can be used as a catalyst support for various catalytically active metals such as a Group VIII metal such as platinum, palladium, nickel, iron or cobalt; molydenum; tungsten; a rare-earth metal and the like. It can also be used in the proton form, i.e., with hydrogen and ammonium ions present. Moreover, the intercalated product can be used in admixture with other common adsorbents or matrix materials such as silica, alumina, silica-alumina hydrogel, crystalline aluminosilicate zeolite and the like. The catalysts which can be utilized in the proton form or which can be prepared by supporting a catalytically active metal on the intercalated clay product of the present invention are especially useful in well-known hydrocarbon conversion processes such as catalytic cracking, hydrocracking, hydrotreating, isomerization and reforming. The metal can be incorporated within the interlamellar region of the expanded clay substrate by impregnation and/or as salts which exchange with metal ions in the clay. Upon reduction with some reducing agent such as hydrogen, the metal ions are reduced to the metal. An especially useful hydrocarbon conversion catalyst is that formed by supporting hydrogen ions, ammonium ions, an ion from Group IB to VIII of the periodic chart or mixture thereof on the intercalated clay product of the present invention. The intercalated clay product of the invention is also useful as a molecular sieve adsorbent.

The intercalated silica product of the present invention containing a catalytically active metal normally used in catalytic hydrogenation reactions such as platinum, nickel, palladium or the like can be used in a variety of hydrogenation reactions such as the hydrogenation of olefins, the hydrogenation of carbon monoxide to methanol and the hydrogenation of carbon monoxide to hydrocarbons, this latter reaction being known as the Fischer-Tropsch reaction.

As especially useful area of utility of the silica intercalated clay of the present invention is in the conversion of hydrocarbon feedstocks. In recent years, because of the depletion of worldwide petroleum feedstocks, attention has been directed to the development of alternate sources of liquid synthetic fuel and gaseous fuels from raw materials such as coal, oil shale and tar sands. Likewise, attention is also being directed to better utilization of native black oils and petroleum resids. The conversion of heavy petroleum liquids to distillate products such as gasoline normally requires catalytic processing, one of the most important of which being catalytic cracking. Molecular sieves have had an important and tremendous impact in petroleum refining in that the use of the same in various refining operations has improved conversion rates as well as product distribution. The catalytic action of molecular sieves is characterized by the following features:

(a) Organic substrates are "intersorbed" in the sieve channel system, i.e. because of the constraining pore size and the "concave" geometry of the internal zeolite surface. An incoming molecule is usually under the simultaneous action of an ensemble of surrounding catalytic sites. Consequently, substrate polarization is considerably stronger, that is, activation is easier, compared to that with conventional catalysts. Further, as a result of approximation and orientation effects operative in the channel systems, intrasorbed reactant molecules are in many cases favorably juxtaposed, with consequent decrease in the activation entropy of the reaction.

(b) Incorporation of catalytically active sites or chemically reactive species in the molecular sieve framework allows for the design and synthesis of a wide variety of specific adsorbents, catalysts and polymeric reagents.

(c) The specific geometry and dimensions of the channel system in a given molecular sieve catalyst allows for performance of molecular-shape selective processes.

Because of the unique characteristics of molecular sieves, they have been widely used in hydrocarbon conversion processes such as cracking, hydrocracking, isomerization, hydroisomerization, alkylation and dealkylation of simple aromatics. However, there are certain severe limitations with respect to the catalytic applications of molecular sieves. In particular, because of the narrow range of critical pore sizes found in such systems (approximately 3–13 Å) intrasorption and reaction of bulky or even medium-sized organic molecules is impossible. For instance, it has been demonstrated that most of the molecules present in raw coal liquids cannot penetrate into the intercrystalline pores of conventional zeolite catalysts. Furthermore, certain organic substrates, including monocyclic aromatic compounds have exhibited low intracrystalline diffusivity in zeolite media, resulting in poor recoveries and fast catalyst aging.

The silica intercalated clay of the present invention is especially useful in the types of catalytic applications discussed above with respect to the cracking of hydrocarbons because the clay can be prepared which has a pore size which exceeds 13 Å (in the $d_3$ direction). It is expected that relatively large size organic molecules such as aromatic compounds will penetrate the pores of the clay where the desired conversion process will occur. Useful hydrocarbon conversion catalysts within the scope of the present invention are the silica intercalated clay functionalized with ions of hydrogen and the rare earth elements including cerium, lanthanum, samarium, neodymium, gadolinium, praseodymium and the like.

Generally speaking, the intercalated clay product of the present invention has an interlayer spacing ($d_2$) of greater than about 12.6 to about 19.0 Å, depending on the clay or a spacing between the layers of about greater than 6 Å, and a nitrogen BET surface area of about 20 to 500 m$^2$/g.

The catalysts of the instant invention and the process for preparing them will be further described below by the following illustrative embodiments which are provided for illustration and are not to be construed as limiting the invention.

COMPOSITION PREPARATION

The following illustrates the preparation of compositions of the instant invention.

EXAMPLE 1

A. Pillaring Agent Preparation 4-(2-trichlorosilylethyl)pyridine (192 g of a 25 wt% solution in toluene; 48.0 g (0.199 mole) of silicon reagent) was added to methanol (175 ml) maintained below 30° C. using an ice/water bath. Water (10.8 ml; 0.60 mole) was added to the solution with stirring. After one month, water (200 ml) was added to the solution and the aqueous phase removed (approximate volume 250 ml containing 200 mmol of silicon).

B. Impregnation of Clay Substrate with Pillaring Agent

Sodium bentonite (10 g) was added with stirring to an aliquot (25 ml) of the silicon pillaring solution prepared as described above. The pH was adjusted from 0 to 6 with concentrated ammonium hydroxide. The mixture was stirred for 2 hours, centrifuged/washed, and dried under vacuum.

X-ray studies and surface area measurements showed that materials prepared in this fashion possess a gap between the layers of about 9.4 Å and a surface area of about 27 m$^2$/g.

C. Calcination

The silica pillared materials prepared as described above can be treated at elevated temperatures in air and/or steam to remove the organic moieties. Table 1 illustrates several different conditions that have been used as well as the resulting surface area of the calcined material.

TABLE 1

| Temp. °C. | Time, hrs. | Atmosphere | Surface Area m$^2$/g | Interlayer Separation, $d_1$, Å |
|---|---|---|---|---|
| 350 | 1 | Air | 27 | 6.8 |
| 550 | 1 | Air | — | 7.5 |
| 650 | 1 | Air | 158 | 6.6 |
| 700 | 6 | Steam | 198 | 7.4 |

EXAMPLE 2

A. Pillaring Agent Preparation

A solution of 2-(2-silylethyl)pyridine oligosilsesquioxane pillar material was prepared from a methanol solution of 2-(2-trichlorosilylethyl)pyridine (24 grams of 2-(2-trichlorosilylethyl)pyridine in 175 ml of methanol) by adding 10.5 ml of water. The mixture was stirred for 1 hour while maintaining the temperature below 30° C.

B. Impregnation of Clay Substrate with Pillaring Agent 7.5 grams of sodium bentonite in 90 ml of water was added with stirring to an aliquot (37.5 ml) of the silicon pillaring solution prepared as described above. The pH was adjusted from 0 to 6 with concentrated ammonium hydroxide. The mixture was stirred for 2 hours, centrifuged/washed, and dried under vacuum.

C. Calcination

Figure 6:
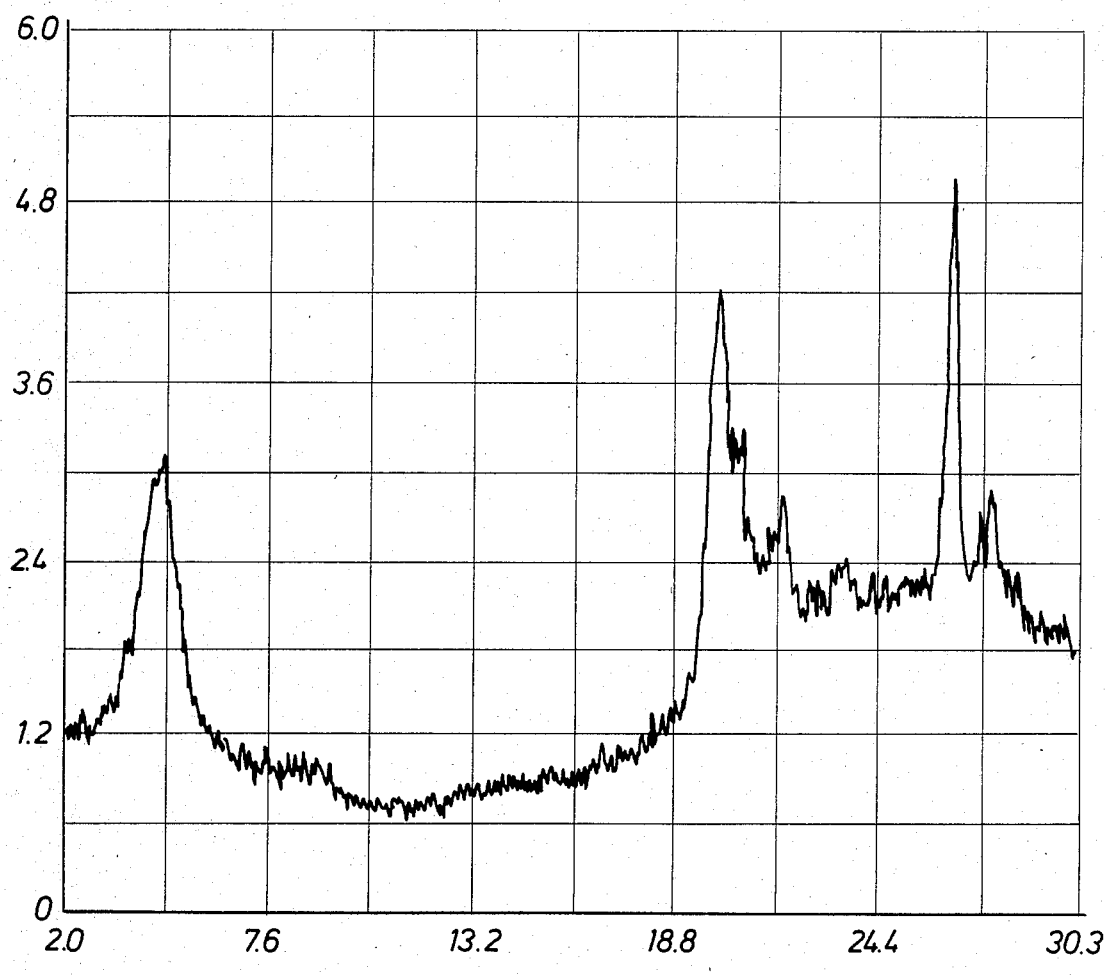
FIG. 6 is an illustration of an X-ray diffraction scan of a composition of the instant invention.

The silica pillar material prepared as described above was calcined in air at 650° C. and analyzed by X-ray diffraction. The diffraction scan is shown in FIG. 6. The 001 diffraction line indicated an interlayer spacing of about 19.2 Å.

EXAMPLES 3-5

A series of compositions were prepared as described above using differing reactants and reaction conditions. The variables and the resultant composition properties are shown in FIGS. 2-4.

TABLE 2

| | Pillaring Agent Preparation | | | | |
|---|---|---|---|---|---|
| Example | Precursor (Mols) | Solvent (ml) | H$_2$O (mols) | Temp, °C. | Time, hours |
| 3 | 2-(2-trichlorosilyethyl)-pyridine (0.1) | Methanol (175) | 0.6 | <30° C. | 1 |
| 4 | 2-(2-trichlorosilyethyl)-pyridine (0.1) | " | " | " | " |
| 5 | 2-(2-trichlorosilyethyl)-pyridine (0.1) | " | " | " | " |

TABLE 3

| | Preparation of Pillared Composition | | | | | | |
|---|---|---|---|---|---|---|---|
| Example | Clay Substrate | (g) | Amount of Pillaring Agent (mmol) | Contact Time, hr | pH | Surface* Area, m$^2$/g | Interlayer Separation, d$_1$Å |
| 3 | Na Bentonite | (10) | 18 | 1 | 6.0 | 261 | 9.8 |
| 4 | Na Bentonite | (10) | 14 | 16 | 6.0 | 247 | 9.7 |
| 5 | Ce Bentonite | (60) | 171 | 16 | 6.5 | 227 | 9.2 |

*After calcination at 650° C. for 1 hour.

TABLE 4

| | Calcination of Pillared Composition | | | | |
|---|---|---|---|---|---|
| Example | Temp. °C. | Time, hr | Atmosphere | Surface Area, m$^2$/g | Interlayer Separation d$_1$Å |
| 3 | 450 | 64 | Air | 404 | 10.2 |
| 4 | 550 | 5 | Air | 350 | 9.7 |
| 5 | 650 | 1 | Air | 281 | 9.7 |

FURTHER EXAMPLES

To illustrate the improved high temperature stability of the instant compositions, a composition prepared similar to Example 2 was sequentially subjected to steam for 1 hour at various temperatures. The resultant effects on the X-ray diffractogram are shown in Table 5 which shows that these compositions have excellent high temperature stability up to about 700° C.

TABLE 5

| | Steam Stability |
|---|---|
| Temp. °C. | Percent of 001 Reflection Retained |
| 600 | 100 |
| 700 | 95.7 |
| 750 | 84.6 |
| 800 | 40.4 |
| 850 | 0 |

A number of samples were prepared similar to Example 2 wherein the contact time of the pillaring agent with the clay was varied from 1 to 48 hours. X-ray diffraction studies of the resultant compositions (uncalcined) showed no substantial difference between the various contact times.

A number of samples were prepared similar to Example 2 wherein the amount of pillaring solution per unit weight of Na-bentonite was varied. The results demonstrate a regular variation in surface area and pore volume versus the amount of pillaring agent used. There results are shown in Table 6.

TABLE 6

| Pillaring Agent mmol/gr bentonite | Pore Vol. cc/g | Surface Area m$^2$/g |
|---|---|---|
| 1.0 | 0.128 | 60 |
| 1.9 | 0.231 | 147 |
| 2.8 | 0.302 | 247 |

A number of samples were prepared similar to Example 2 wherein the pH of the oligosilsesquioxane impregnating solution was varied. X-ray diffraction studies showed that there was a change in pillaring efficiency around pH 5. Below pH 5 the exchange was poor and improved above pH 5. Surface area measurements confirmed this effect of pH. These results are shown in Table 7. For this particular clay and impregnation solution, the optimum pH appears to be about 6-7.

TABLE 7

| pH | Surface Area, m$^2$/g |
|---|---|
| 4.0 | 60 |
| 5.25 | 176 |

COMPOSITION UTILITY

The following examples demonstrate the use of the instant composition as catalysts/supports.

HEXANE HYDROISOMERIZATION

Cerium bentonite was pillared in a manner similar to that described in Example 1 using 4-(2-trichlorosilylethyl)pyridine as a pillar precursor. The material was calcined in air at 650° C. for 1.5 hours. The material was then impregnated with tetraamine platinum (II) chloride to give a nominal 0.5% weight loading of platinum metal. The catalyst was dried at 100° C. and pelletized to 20-30 mesh particle size. The catalyst (7.5 cc, 4.05 g) was loaded into a ⅜" ID tubular flow reactor with 60-80 mesh silicon carbide above and below the catalyst bed. The catalyst was oxidized in oxygen (500 cc/min) at 400° C. for 2 hours. The reactor was stripped with nitrogen and the catalyst reduced in hydrogen (112.5 cc/min) at 400° C. for 1 hour. The hexane isomerization reaction was then carried out with hydrogen (850 psi, 112.5 cc/min) and hexane (7.5 cc/hour). The catalyst was found to give a 30% conversion of hexane at about 350° C.

CATALYTIC CRACKING

A silicon pillared cerium bentonite catalyst prepared similar to Example 5 was tested for cracking activity utilizing a hydrotreated light cat cracker feed. A standard microactivity test reactor was utilized and is described in F. G. Ciapetta & D. S. Henderson, *The Oil & Gas Journal*, 1967, 65, 88.

The results are shown below:

TABLE 8

| |
|---|
| 45% Conversion |
| 5% Coke |
| 22% $C_6$ - 450° F. boiling range |
| 18% 450–650° F. boiling range |
| (25 WHSV weight hourly space velocity) |

We claim:

1. A clay composition comprising silica pillars intercalated between the layers of an expandable, swelling layer, lattice clay mineral or synthetic analogue thereof wherein said silica pillars comprise at least two silicon atom layers.

2. The composition of claim 1, wherein said clay is smectite, or vermiculite.

3. The composition of claim 2, wherein said smectite is montmorillonite, bentonite, hectorite, beidellite, saponite, nontronite, or sauconite.

4. The clay composition of claim 2, wherein said smectite has the formula: $(M^{IV})_8(M'^{VI})_pO_{20}(Q)_4$ wherein p equals 4 for cations with a +3 charge, p equals 6 for cations with a +2 charge, Q is hydroxyl or fluoride, IV indicates an ion coordinated to four other atoms, VI indicates an ion coordinated to six other atoms, M is $Si^{+4}$, optionally partially substituted by $Al^{+3}$, $P^{+5}$, $B^{+3}$, $Ge^{+4}$ and $Be^{+2}$, and M' is $Al^{+3}$ and/or $Mg^{+2}$, optionally partially substituted by $Fe^{+3}$, $Fe^{+2}$, $Ni^{+2}$, $Co^{+2}$ and $Li^{+1}$.

5. The clay composition of claim 1, wherein the layer separation of said intercalated clay is greater than about 6 Å.

6. The clay composition of claim 1, wherein the intercalated clay has a nitrogen BET surface area of about 20 to about 500 m²/g.

7. A process for preparing a clay composition comprising clay having silica pillars intercalated between the interlayers of said clay wherein said silicon pillars comprise at least two silicon atom layers, which process comprises contacting a smectite type clay with a solution of a polyhedral oligosilsesquioxane of the following general formula $(ZSiO_{1.5})_n(OSiZ_2)_m$, where n and m are zero or integers and n+m does not equal zero and Z is an organic moiety containing an atom(s) possessing cationic and/or coordinating characteristics with the proviso that all of the Z's on a particular oligosilsesquioxane need not be the same.

8. The process of claim 7 wherein n+m ranges from 4 to about 12.

9. The process of claims 7 or 8 wherein the organic material in said intercalated clay is removed by heating to a temperature ranging from about 100° to about 800° C.

10. The process of claims 7 or 8 wherein the organic material of said intercalated clay is removed by heating in an oxygen- or steam-containing atmosphere at a temperature ranging from about 400° to about 800° C.

11. A hydrocarbon conversion catalyst comprising the silica intercalated clay product of claim 1 admixed with a matrix material.

12. An adsorbent comprising the silica intercalated clay product of claim 1 ground into particles of a Tyler mesh size range of about 4 to 400 or spray dried.

13. A hydrocarbon conversion catalyst, comprising the silica intercalated clay product of claim 1 functionalized with a Group VIII metal, W or Mo.

14. A hydrocarbon conversion catalyst, comprising the silica intercalated clay of claim 1 functionalized with a cation selected from the group consisting of hydrogen, ammonium, Group IB to VIII of the Periodic Table and mixtures thereof.

15. A cracking catalyst comprising the silica intercalated clay product of claim 1 functionalized with ions selected from the group consisting of hydrogen and the rare earth elements.

16. A hydrocarbon conversion catalyst comprising the silica intercalated clay product of claim 1.

* * * * *